United States Patent [19]

Young et al.

[11] 4,389,721
[45] Jun. 21, 1983

[54] TIME-DIVISION MULTIPLEX SERIAL LOOP

[75] Inventors: William R. Young; Stanley R. Zepp, both of Palm Bay, Fla.

[73] Assignee: Harris Corporation, Melbourne, Fla.

[21] Appl. No.: 278,990

[22] Filed: Jun. 30, 1981

[51] Int. Cl.³ .......................... H04J 6/02; G08B 5/00
[52] U.S. Cl. .................................................. 370/88
[58] Field of Search ...................... 370/88, 92, 94, 86, 370/60, 77, 83, 85, 89, 90, 91, 105

[56] References Cited

U.S. PATENT DOCUMENTS

Re. 28,811  5/1976  Pierce .................................. 370/88
4,287,592  9/1981  Paulish et al. ........................ 370/88

Primary Examiner—Thomas A. Robinson
Attorney, Agent, or Firm—Leitner, Palan, Martin & Bernstein

[57] ABSTRACT

A loop controller transmits data to and receives data from a plurality of I/O ports on a TDM serial loop by generating a plurality of frames which include a frame control field followed by a plurality of dedicated time slot fields. Each time slot field includes an inbound data control bit or bits followed by a data field followed by an outbound data control bit or bits. The I/O port inputs and outputs data in its dedicated data field as dictated by the respective data control bit. The loop controller and I/O ports monitor the data control bit to request data, indicate insertion of data, indicate receipt of the data and acknowledge the receipt indication to achieve a complete handshake. During an initialization frame, the I/O ports set themselves into primary and secondary data modes based on sensing a prior I/O port with the same dedicated time slot. Separate primary, secondary, inbound and outbound data control bits permit interleaved communication by the loop controller to and from plural ports with the same dedicated time slot.

32 Claims, 17 Drawing Figures

OUTBOUND FROM CONTROLLER FORMAT

INBOUND TO CONTROLLER FORMAT

INITIALIZATION FRAME
A

DATA FRAME
B

LOGIC 0
A

LOGIC 1
B

CLOCK

OUTBOUND DATA FLOW AT THE
LOOP CONTROLLER DURING
RECEIVE TIME OPERATIONS

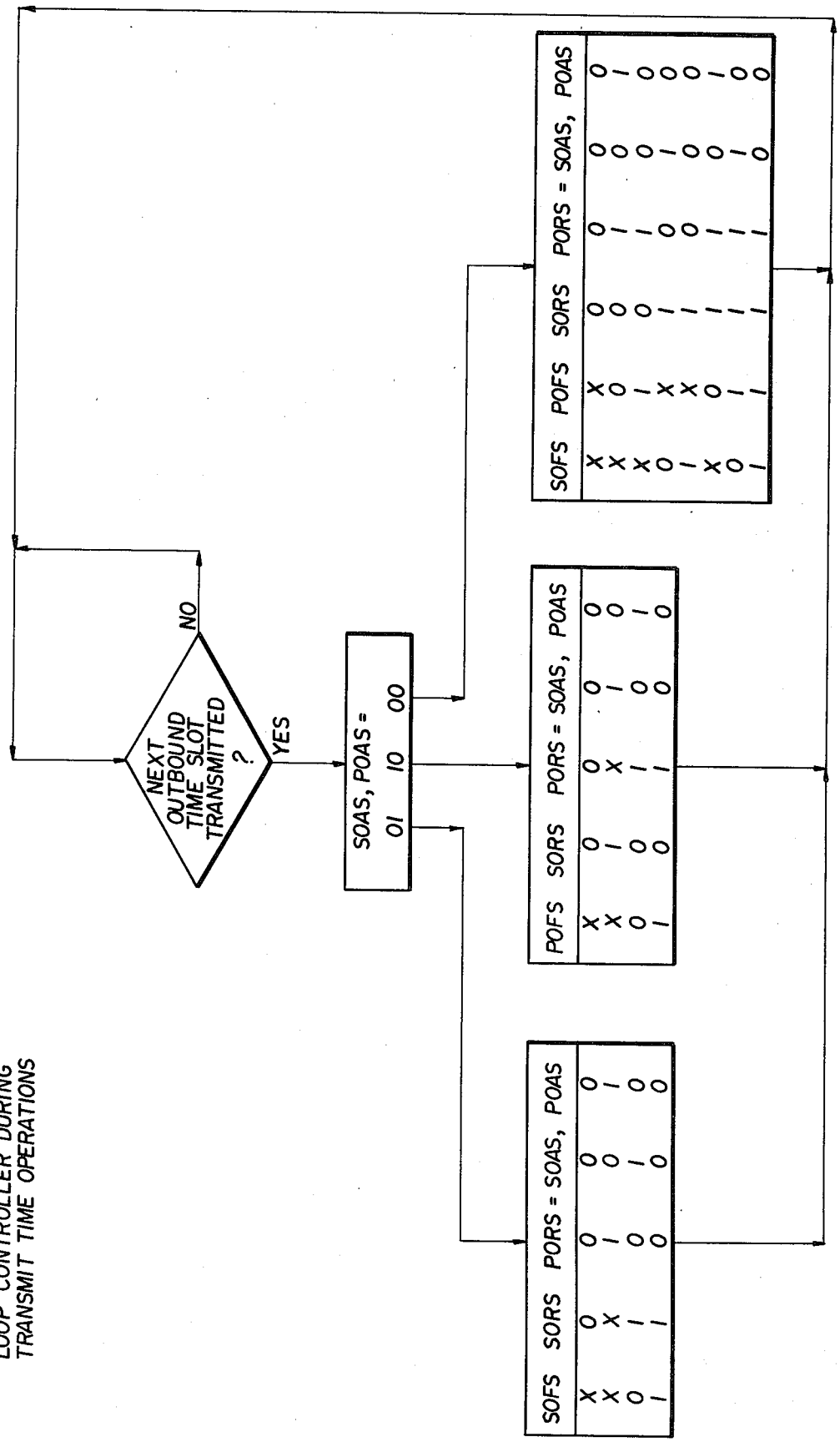
FIG. 15 OUTBOUND DATA FLOW AT THE LOOP CONTROLLER DURING TRANSMIT TIME OPERATIONS

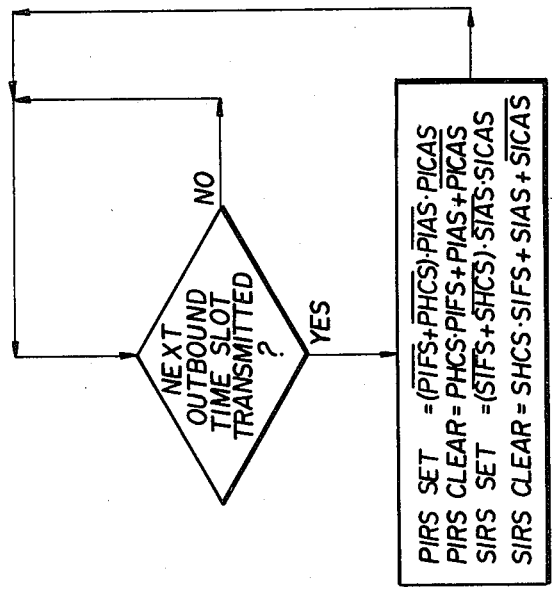
FIG.17 INBOUND DATA FLOW AT THE LOOP CONTROLLER DURING TRANSMIT TIME OPERATIONS
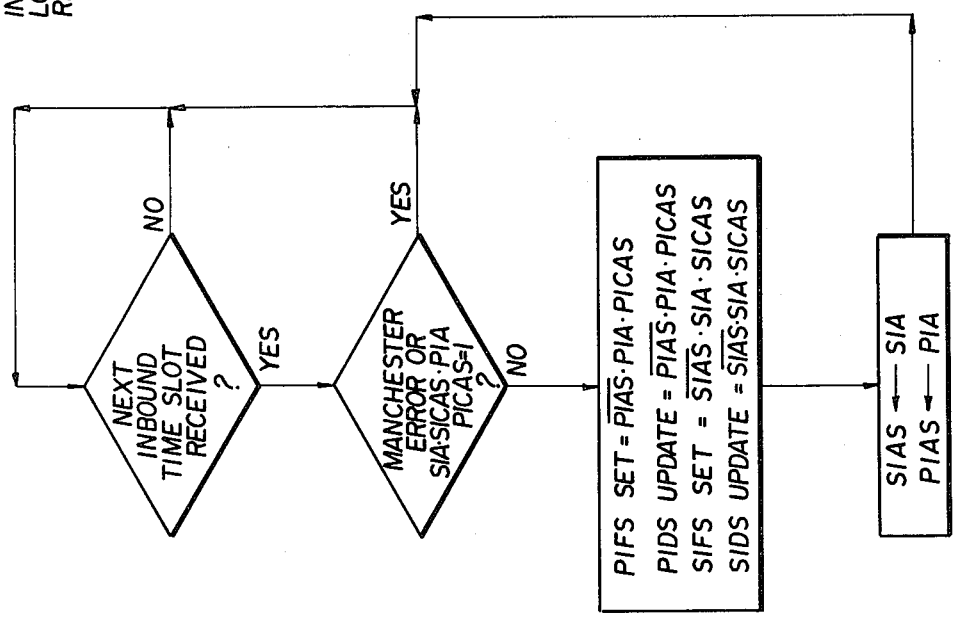
FIG.16 INBOUND DATA FLOW AT THE LOOP CONTROLLER DURING RECEIVE TIME OPERATIONS

TIME-DIVISION MULTIPLEX SERIAL LOOP

BACKGROUND OF THE INVENTION

This invention relates to data transfer systems in general, and more particularly, to serial loop data transfer systems in which data is transmitted in one direction around a loop transmission means.

Loop data transfer systems have been known for several years and several control techniques have been devised in order to allow a master terminal or controller to communicate with a plurality of I/O terminals connected to the loop. One advantageously simple technique involves a form of time division multiplexing in which various time slots are permanently assigned to I/O terminals. Messages to and from I/O terminals are transmitted in the permanently assigned time slots. It is apparent that such a system is relatively inefficient for interactive I/O terminals since the communications capacity of a permanently assigned time slot is wasted during periods of inactivity of the associated I/O terminal.

To allow other terminals to use time slots not being used, addressed message communications systems have been developed wherein data is preceded by the address of the receiving terminal. These systems are also inefficient because bandwidth is consumed in transmission of addresses which would otherwise be available for data transmission. Furthermore, contention problems arise wherein two or more terminals attempt to transmit at the same time. Contention has been resolved by having the master terminal poll each of the I/O terminals for messages or by hub polling wherein each I/O terminal, after being polled, polls the next I/O terminal. These polling procedures likewise reduce bandwidth available for data transmission and further complicate the communication system.

Protocols used on existing serial busses such as SDLC, Bi-Sync or various other asynchronous polling protocols require considerable program memory and processor overhead at the host processor. Also, the systems are designed around block transfer which prevents the interleaving or simultaneous data transfer to more than one I/O device at a given time block.

SUMMARY OF THE INVENTION

The present invention overcomes the problems of prior art TDM loop systems by allowing the use of assigned time slots by a plurality of devices with a minimum number of control bits or overhead per time slot. The serial loop is designed around non-block oriented I/O devices. The serial loop includes a loop controller which interfaces the host processor bus and the serial loop. The loop controller generates a plurality of frames around the loop each of which includes a frame control field followed by a reset bit which is followed by a plurality of time slot fields. The time slot fields each include a primary and secondary inbound data control bit, followed by an eight bit data field which is followed by secondary and primary outbound data control bits. The plurality of I/O ports connected to the serial loop receive the plurality of frames, monitor the frame control bit to determine whether it is initialization or a data frame and perform data transfers into and out of their assigned data time slots based upon the inbound and outbound data control bits of their time slots. By using separate primary and secondary and inbound and outbound data control bits, up to four ports may use the same assigned time slot. During initialization frames, the I/O ports monitor the data control field of their assigned time slots to sense whether a prior I/O device has responded to the initialization frame and accordingly set themselves into a primary or secondary mode depending upon whether there is a response or not and provide a response in the data control bits so that subsequent I/O ports having the same assigned time slot may set themselves into a secondary data mode.

The present format uses two data frames to transfer data and complete a handshake. For outbound data, an I/O port requests data using its outbound data control bit, the loop controller inserts data in the data field and indicates such insertion by the outbound data control bit, the I/O device indicates receipt of the data by the outbound data control bit and finally, the loop controller acknowledges the receipt of data by the I/O means by the outbound data control bit. For inbound data, the operation is reversed with the loop controller requesting and indicating receipt of data using the inbound data control bit and the I/O means indicates insertion of data and acknowledges receipt of data by the loop controller using the inbound data control bits.

OBJECTS OF THE PRESENT INVENTION

An object of the present invention is to provide a serial loop for interfacing a hot processor and a plurality of peripheral devices with generally incompatible protocols.

Another object of the present invention is to provide a format which allows multiple I/O ports use of preassigned time slots without requiring additional bandwidth.

Still another object of the present invention is to provide a serial loop wherein the I/O ports determine their own priority during an initialization sequence.

A still further object is to provide a TDM serial loop with preassigned or dedicated time slots which is designed around a byte, non-block oriented data transfer.

Other objects, advantages and novel features of the present invention will become apparent from the following detailed description of the invention when considered in conjunction with the accompanying drawings.

BRIEF DESCRIPTION OF THE DRAWINGS

FIG. 15 is a flow diagram for outbound data flow at the loop controller during transmit time operations.

FIG. 16 is a flow diagram for inbound data flow at the loop controller during receive time operations.

FIG. 17 is a flow diagram for inbound data flow at the loop controller during transmit time operations.

DESCRIPTION OF THE PREFERRED EMBODIMENTS

Figure 1:
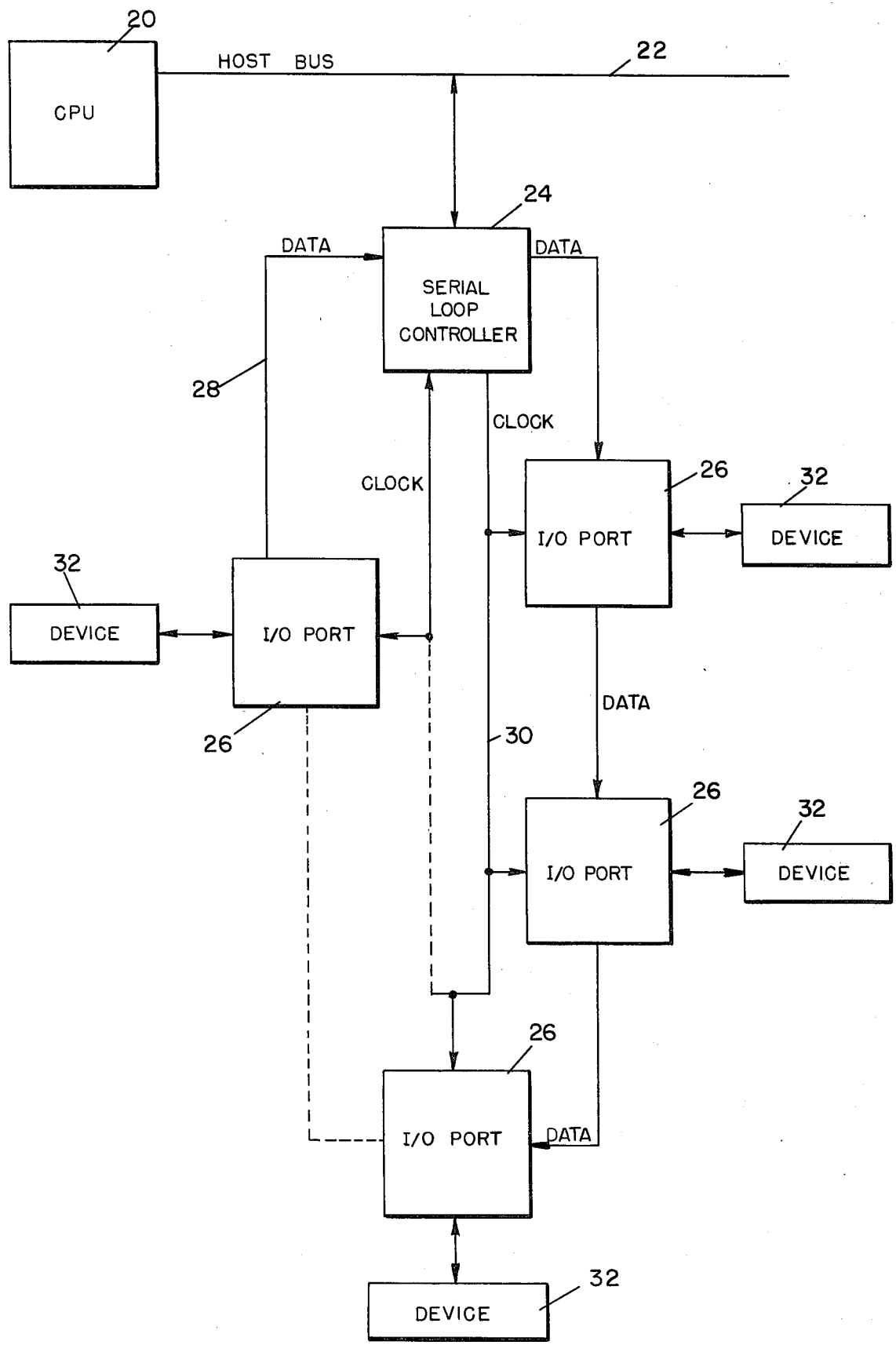
FIG. 1 is a schematic block diagram of a serial loop incorporating the principles of the present invention.

As illustrated in FIG. 1, a central processing unit (CPU) 20 has a host bus 22 connected to a serial loop controller 24. A serial loop includes the serial loop controller 24 and a plurality of input/output (I/O) ports 26 connected by a serial data loop 28 and a parallel clock loop 30. The I/O ports 26 connect a respective peripheral device 32 to the serial loop. The serial loop controller 24 and the I/O ports 26 provide an interface between the processor 20 and the peripheral devices 32. The serial loop controller 24 is processor dependent, appearing to the processor as a block of peripheral I/O devices, while the I/O ports 26 are device dependent. The serial loop 28 is independent of the processor 20 and the peripheral devices 32 thus provide an independent interface between the processor and the peripheral devices.

The serial loop controller 24 receives instructions from the processor 20 to transmit data from bus 22 or provide data to bus 22 from a particular peripheral device 32. Serial loop controller 24 continuously generates a plurality of frames around the serial loop 28 controlling the I/O ports to transmit or request data from the peripheral devices 32.

Figure 2:
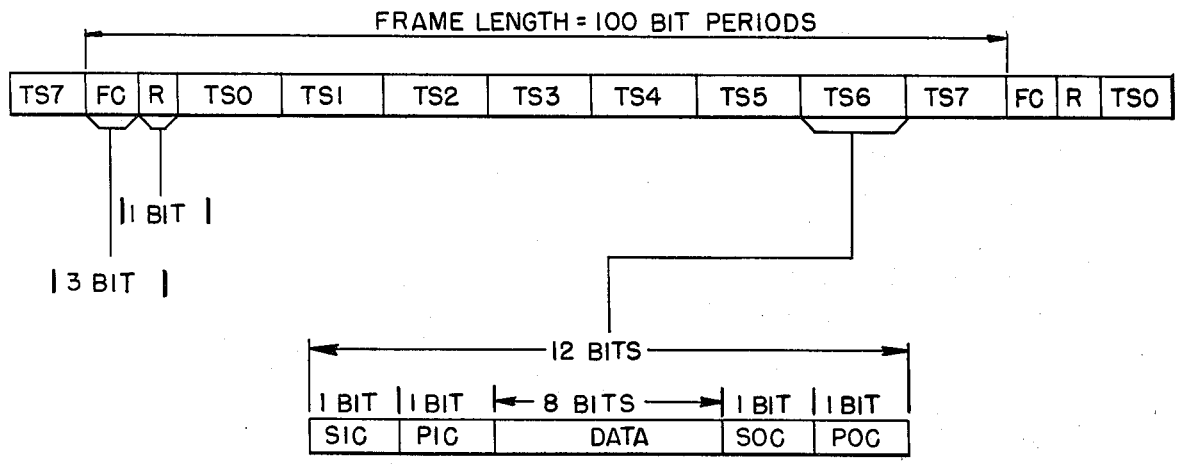
FIG. 2 is a map of a frame format incorporating the principles of the present invention.

A typical frame is illustrated in FIG. 2 as including one hundred bit periods beginning with a frame control field (FC) of three bits followed by a reset field (R) of one bit followed by eight time slot fields (TS0-TS7). The time slot fields each are twelve bits long including a secondary inbound data control bit (SIC) followed by a primary inbound data control bit (PIC) followed by eight data bits which are followed by a secondary outbound data control bit (SOC) followed by a primary outbound data control bit (POC). Each I/O port 26 is assigned, by external programming, one of the dedicated time slots TS0-TS7. Each I/O port 26 ignores or passes through the information not in its assigned of dedicated time slot with the exception of the frame control and reset bits. The I/O port monitors its dedicated time slot and inserts data into its data field or receives data from its data field based upon the primary or secondary inbound or outbound data control bits.

Figure 3:
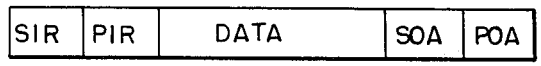
FIG. 3 is a map of a time slot format for the time slot outbound from the controller.
Figure 4:
FIG. 4 is a map of a time slot format for a time slot inbound to the controller.

It should be noted that the terms "inbound" and "outbound" are relative to the serial loop controller. Thus, inbound data is data from a peripheral device inserted inbound from an I/O port around the loop to the serial loop controller to be transmitted to the central processing unit 20 and outbound data is data from the central processing unit outbound from the serial loop controller to an appropriate peripheral device 32 through a corresponding I/O port 26. The data control bits SIC, PIC, SOC, POC, are redefined for an outbound from controller format and an inbound to controller format as illustrated in FIGS. 3 and 4 respectively. The outbound from the controller time slot format includes a secondary inbound data request bit (SIR), a primary inbound data request bit (PIR), a secondary outbound data available bit (SOA), and a primary outbound data available bit (POA), as illustrated in FIG. 3. The inbound to controller time slot format includes a secondary inbound data available bit (SIA), a primary inbound data available bit (PIA), a secondary outbound data request bit (SOR) and a primary outbound data request bit (POR) as illustrated in FIG. 4.

TABLE I
DATA FRAME PROTOCOL

| SOA<br>SIA | POA (OUTBOUND)<br>PIA (INBOUND) | |
|---|---|---|
| 0 | 0 | NULL |
| 0 | 1 | PRIMARY DATA AVAILABLE |
| 1 | 0 | SECONDARY DATA AVAILABLE |
| 1 | 1 | INVALID |

| SIR<br>SOR | PIR (OUTBOUND)<br>POR (INBOUND) | |
|---|---|---|
| 0 | 0 | NO REQUESTS |
| 0 | 1 | PRIMARY DATA REQUEST |
| 1 | 0 | SECONDARY DATA REQUEST |
| 1 | 1 | PRIMARY AND SECONDARY DATA REQUEST |

The function of the data control bits are summarized in Table I. Secondary and primary data available control bits (SOA, POA, SIA, PIA) having a value 00 signifies that the time slot contains no information in the eight bit data field. A value of 01 signifies the time slot contains primary data in the eight bit data field. The value 10 signifies that there is secondary data in the eight bit data field. The value 11 is an invalid state indicating an improper operation or transmission error. The secondary and primary data request control bits (SIR, PIR, SOR, POR) having a value 00 indicates no request for data transmission or the inability to receive new information. A value 01 indicates a primary data request, a value of 10 indicates a secondary data request and a value of 11 indicates a primary and a secondary data request.

The outbound frame controller format illustrated in FIG. 3 is specifically designed such that the secondary and the primary inbound data request bits (SIR, PIR), precede the eight bit or byte data field. This allows each of the I/O ports to identify on the leading edge of its time slot, a request for data and allows for transmission on the same frame of requested data if it is available in the I/O port. Since a secondary and primary inbound data control bit precede the data field, at least two bit period delay must be provided to recognize the code and a third bit delay to allow insertion of data into the first bit of the data field resulting in a total three bit period delay. Since outbound data may be read from the data field without removing it from the data field, the outbound data control bits in the outbound format are provided at the end of the time slot after the data field. This reduces the delay time per I/O port to two bit periods.

The data control bits not only provide access of the I/O ports to the eight bit data of their dedicated or assigned time slots, but also perform a handshake function. To produce inbound data, the sequence begins at frame one with the loop controller 24 providing an inbound data request control bit SIR to PIR set to one in the outbound format. The I/O port whose inbound data control bit is set (SIR or PIR) inserts data in the eight bit data field and inserts or sets an inbound data available control bit (SIA or PIA) in the inbound format of frame one. In frame two, the loop controller clears the inbound data request control bit to indicate receipt of the inbound data. The I/O port which transmitted data in the previous frame also clears the inbound data available control bit to acknowledge that the controller has cleared the inbound data request control bit. Either end will act to drive to complete the handshake. The sequence is the same for outbound data using the outbound data control bits wherein an I/O port requests outbound data, the loop controller provides outbound data, the I/O port indicates receipt of data and the loop controller acknowledges the I/O port receipt of data.

Figure 5:
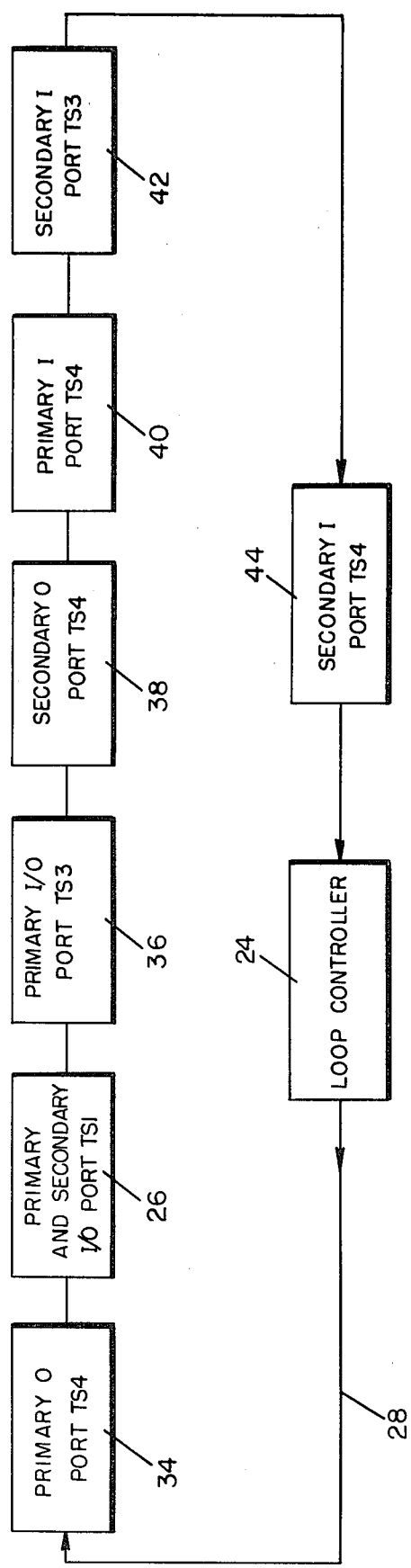
FIG. 5 is a block diagram of another serial loop incorporating the principles of the present invention.

By using separate data control bits for secondary and primary data and for inbound and outbound data, the transmission and handshaking of secondary, primary, outbound and inbound data may be interleaved or performed on a staggered basis. A single data control bit provides transmission of data between the loop controller and the I/O port as well as handshaking. Although the format of FIGS. 2-4 show the use of secondary and primary data, it should be noted that a single inbound data control bit and a single outbound data control bit may be used. By using separate inbound and outbound data control bits and primary and secondary data control bits, as many as four ports may use the same time slot if two of the ports are only inputting devices and the other two are only outputting ports. Both output ports must precede the input ports in the loop because data must be removed from the time slot by both output ports before the time slot is available to accept input data. A loop having such a combination of ports is illustrated in FIG. 5.

The loop includes a loop controller 24 having a serial bus 28 interconnecting a primary output only port 34, a primary and secondary I/O port 26, a primary I/O port 36, a secondary output only port 38, a primary input only port 40, a secondary input only port 42 and a secondary input only port 44. Other various combinations of I/O, I only and O only ports complete the loop. The primary and secondary I/O port 26 is programmed to dedicated time slot 1. The primary I/O port and secondary input only port 36 and 42 respectively are programmed to share dedicated time slot TS-3. The primary output port, secondary output port, primary input port and secondary input port 34, 38, 40 and 44 respectively are programmed to share dedicated time slot TS-4. The arrangement of the serial loop of FIG. 5 is selected to illustrate the requirements of the relationship of time slot shared devices. To be more specific, the primary devices must precede the secondary devices for the shared time slot as illustrated by primary I/O and secondary input only ports 36 and 42 respectively sharing time slot TS-3. Also, the output only devices must precede the input only devices on the serial bus as illustrated by primary and secondary output only ports 34 and 38 preceding primary and secondary input only ports 40 and 44 for shared time slot TS-4. The arrangement also illustrates that the ports on the serial bus need not be located in the order of their assigned or dedicated time slots. FIG. 5 illustrates just one example of ports, and other types of ports may be used which obey the requirements that output ports precede input ports and primary ports precede secondary ports for the same time slot.

By providing the output only ports on the serial loop before the input only ports, and by using separate inbound and outbound data control bits, outbound and inbound data may be transmitted on the same time slot during the same frame without interference. For example, the primary outbound data control bit POC for TS-4 may be set by the loop controller to indicate primary data available (POA) and upon receipt of the signal by primary output port 34, it will remove the data and set the primary outbound control bit indicating receipt of the data. When the time slot of the same frame reaches primary inbound or secondary inbound ports 40 or 44, respectively, either of these ports may input data if their inbound data control bits were set by the loop controller requesting inbound data. Thus, it can be seen by using separate inbound and outbound data control bits, devices sharing the same time slot may perform outbound and inbound data transfers during the same frame.

Figure 6:
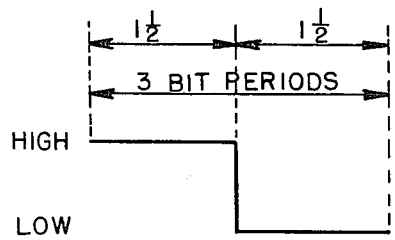
FIGS. 6A and 6B are wave forms of the frame control bits for initialization and data frames respectively.
Figure 6:
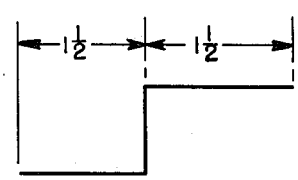
Figure 7:
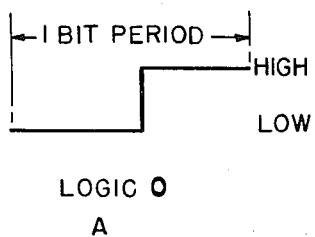
FIGS. 7A and 7B are waveforms of the bit pattern for logic 0 and logic 1 respectively.
Figure 7:
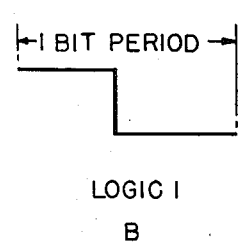
Figure 8:
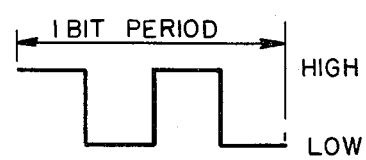
FIG. 8 is a waveform of the clock line signal.

Referring again to the frame format of FIG. 2, it includes a three bit frame control field followed by a reset field followed by the eight time slot fields. The frame control field (FC) is used to identify the type of frame, namely, an initialization or a data frame as well as being used by the I/O ports and the loop controller to identify the beginning of the frame and to determine the preassigned or dedicated time slot relative to the beginning of the frame. The reset bit R can be used during initialization or data frame. The present system uses Manchester encoding to allow remote clock recovery on long distance buses or serial loops and to provide error detection capability. As illustrated in FIG. 6, the three bit wide frame control field is an invalid Manchester sequence wherein two of the bits have a fixed value for a total bit period. This allows the I/O port to identify the frame control field and determine its time slot field therefrom. The frame control field having a high one and one half period to low one and one half period transition signifies an initialization frame format and a transition from a low one and one half bit period to a high one and one half bit period signifies a data frame format. The bit pattern for the remainder of the bits in the frame includes a logic zero represented by a half a bit period low to a half a bit period high transition and a logic one signified by a high half a bit period transition to a half a period low as illustrated in FIGS. 7A and 7B, respectively. The signal on the clock line 30 is shown in FIG. 8 as including two high low transition per bit periods.

The initialization frames allow acquisition by the controller of frame synchronization. They also provide for reset of all I/O ports and associated devices, allow identification of the type of devices and the time slot to which they are dedicated to be sent to the loop controller and allow programming of the I/O ports to define operating modes of the I/O ports. In addition to initialization as commanded by the host processor, automatic reinitialization occurs if the inbound frame synchronization or clock is lost at the loop controller. For an initialization frame, the data control bits for each time slot do not have the same meaning as that for a data frame. As listed in Table II, the inbound data control bits define the type of initialization frame and are not changed from the outbound to the inbound format. The outbound format has the outbound data control bits set to zero whereby the inbound response is inserted in the outbound data control bits.

TABLE II
INITIALIZATION FRAME PROTOCOL

OUTBOUND

| FRAME NO. | SIR | PIR | SOA | POA | |
|---|---|---|---|---|---|
| 0 | 0 | 0 | 0 | 0 | OUTPUT IDENTIFICATION FRAME |
| 1 | 0 | 1 | 0 | 0 | INPUT IDENTIFICATION FRAME |
| 2 | 1 | 0 | 0 | 0 | OUTPUT PROGRAMMING FRAME |
| 3 | 1 | 1 | 0 | 0 | INPUT PROGRAMMING FRAME |

INBOUND RESPONSE

| FRAME NO. | SIA | PIA | SOR | POR |
|---|---|---|---|---|
| 0 | 0 | 0 | * | * |
| 1 | 0 | 1 | * | * |
| 2 | 1 | 0 | * | * |
| 3 | 1 | 1 | * | * |

RESPONSE CONDITIONS

| SOAPOA | OUTBOUND DEVICE TYPE | SORPOR | DATA MODE |
|---|---|---|---|
| Frame No. 0, 1 | | | |
| 00 | DON'T CARE | 01 | Primary |
| 01 | =HEX '01' | 10 | Secondary |
| 01 | ≠HEX '01' | 11 | Secondary |
| 1X | DON'T CARE | 11 | Secondary |
| Frame No. 2, 3 | | | |
| 00 | DON'T CARE | 01 | Primary |
| 01 | DON'T CARE | 10 | Secondary |
| 1X | DON'T CARE | 11 | Secondary |

For an initialization frame 0, output secondary ports and devices are identified. The loop controller transmits an inbound data control bit of 00. If the reset bit is a logic one, all ports on the loop perform their required internal initialization and will return to a default programming state defined for each I/O port. If the reset bit is a logic zero, no initialization occurs. All input ports on the loop repeat all the data received in the outbound stream. Each data output port, upon detecting its time slot, puts an eight bit code identifying the device type (for example hex '01') in its data field and repeats or sets the inbound data control bits to 00. If the port detects outbound control bits of 00 then the port sets the outbound data control bits to 01. As indicated in Table II, the output port is also set to operate in a primary data mode and is so reflected to the loop controller. If the output port detects outbound data control bits of 01, indicating a prior output port on the loop having the same dedicated time slot and the outbound device code equals hex '01', then the output port sets the outbound control data bits to 10 and enters the secondary data mode. If the device code in the data field is not hex '01', or the outbound data control field is 1X (wherein X is a don't care state), the output port sends an outbound data control field of 11 and enters the secondary data mode.

For an initialization frame 1 having an inbound data control field of 01, all ports perform initialization if the reset bit is set, but do not return to the default programming state. Since the initialization frame one is an input identification frame, all output devices repeat all data received in the output frame and the input ports perform the same sequence as just described for the output ports in response to the initialization frame 0.

The loop controller, when commanded by the host processor, transmits programming information to all output ports using initialization frame 2 having an inbound data control field of 10, and to all input ports using an initialization frame 3 having an inbound control data field of 11. The port upon recognizing its time slot provides the initialization frame number received outbound as an inbound data control field, reads the information in the data field and monitors the output data control field. If the received outbound data control field is 00, it sends inbound and outbound data control field 01 and assumes the primary data mode. If the received outbound data control field is 01, it sends inbound and outbound data control field of 10 and assumes a secondary data mode. If the received outbound data control field is IX, the I/O port sends inbound an outbound data control field of 11 and enters the secondary data mode.

During any initialization frame, any I/O port detecting an outbound Manchester error repeats the error inbound so that it may be detected by the loop controller. The loop controller upon detecting an inbound Manchester code error on any initialization frame which it has not already received error free, will repeat the same initialization frame until it is received error free. If the initialization is initiated by a power on reset, then initialization frames 0 and 1 include a reset bit of one so that all devices are programmed to the default state. If the initialization occurs for any other reason, the initialization frames 0 and 1 may contain a reset bit of 1 or 0 depending upon the host processor commands.

The initialization routine described for the serial loop is the same whether the loop includes I/O ports capable of inputting and outputting data in a primary and secondary data mode or separate I/O ports dedicated to the same time slot being set by the initialization routine in a primary or a secondary mode or four individual ports dedicated to the same time slot, two capable of only outputting data and two capable only of inputting data being initialized into primary and secondary modes.

I/O PORT

Figure 9:
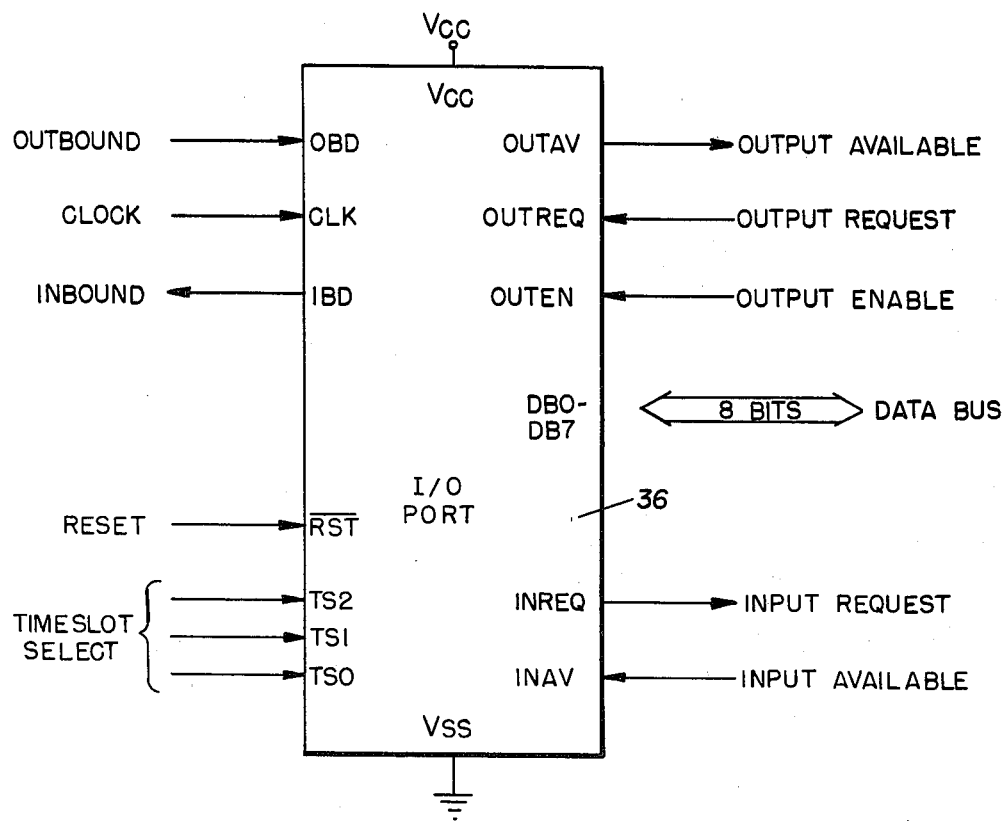
FIG. 9 is a block diagram of the pin connections of a serial to parallel bidirectional I/O port incorporating the principles of the present invention.
Figure 10:
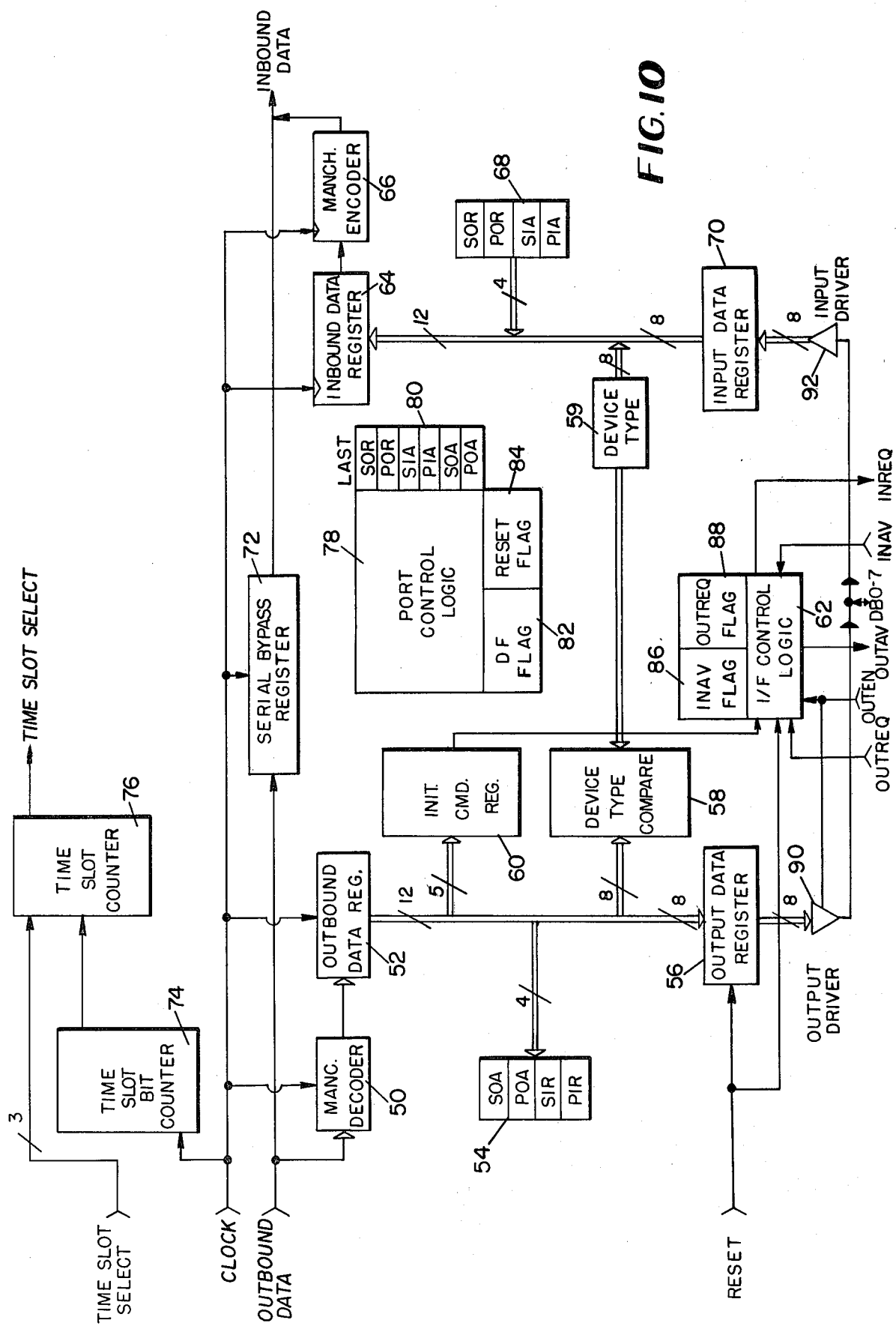
FIG. 10 is a block diagram of an I/O port incorporating the principles of the present invention.

A bi-directional serial to parallel port 36 is illustrated with its pin count in FIG. 9 and its block diagram detailed in FIG. 10. The I/O port 36 is connected to the serial loop by an outbound data pin OBD, an inbound data pin IBD and the clock pin CLK. The I/O port has an assigned or dedicated time slot programmed by time slot select pins TS0–TS2. A reset pin $\overline{RST}$ is provided to reset output data registers and to interrupt dynamic parallel operations to the peripheral device. The I/O port 36 is connected to a bi-directional peripheral device by an eight bit parallel bus at pins DB0-DB7. The I/O port requests data from the peripheral device by signal on input request pin INREQ and the peripheral device indicates that data is available on the parallel bus by returning a signal on input available pin INAV. The peripheral device indicates that it is ready to receive data by putting a signal on output request OUTREQ and the I/O port indicates that it has data available for the peripheral device providing a signal on output available pin OUTAV. The I/O port output driver is on the parallel bus and it is controlled by a signal from the peripheral device on the output enable pin OUTEN. For a port which is only to input data from a peripheral device to the serial loop the OUTAV, OUTREQ and OUTEN pins would be deleted. Similarly, for a port which has a peripheral device which will only output data from the serial loop, the INREQ and INAV pins would be deleted. While the outbound and inbound data pins as well as the time select pins would remain the same, the port interface (except OUTEN) with the peripheral device can be customly programmed to interface with any type of peripheral device. The I/O port of FIG. 9 is an example of a port which may be interfaced with a relatively large number of peripheral devices.

The I/O port, as illustrated in detail in FIG. 10, can be considered to have three functional sections, namely, the outbound loop section, inbound loop section and the peripheral device interface. The outbound loop section receives data on the outbound serial loop and introduces it into a Manchester code decoder 50 which decodes the outbound data and shifts the results into a twelve bit outbound data shift register 52. The data control bits in the outbound format, namely SOA, POA, SIR, PIR are provided in the temporary store 54 and the data field of the outbound data format is provided in output data register 56. Also connected to the data register 60, both of which are to be used during the initialization format. The device type compare circuit compares the device type, which may be hardwired as at 59, with the data field in the number 0 and the number 1 initialization frames. Initialization command register 60 stores five bits of the data field during the initialization frames to determine the polarity of the pins interfacing the port with the peripheral device via interface control logic 62.

The inbound loop section of the I/O port includes a twelve bit inbound data shift register 64 providing an inbound signal in its dedicated time slot through a Manchester encoder 66. The data control bits for the inbound time slot, namely, SOR, POR, SIA, PIA, are provided by temporary store or buffer 68, and the data for the data field during data frames is provided by input data register 70. Also connected to the inbound data register 64 is the device type store 59 which as indicated earlier may be a hardwire constant. This value is provided in the inbound data field during the number 0 and number 1 initialization frames.

Data bits not in the assigned or dedicated time slot of the I/O port are transmitted from the output data pin to the inbound data pin through a serial bypass register 72.

The bypass register 72 is three bits long to effectuate a delay equivalent to the internal delay of the I/O port in processing outbound and inbound data in its dedicated time slot. Since the bypass register 72 repeats the outbound data on the inbound data side exactly as received, all received errors not in the assigned or dedicated time slot are transmitted on the inbound data.

To determine when the assigned or dedicated time slot in the frame is present, a time slot bit counter 74 and a time slot counter 76 are driven by the clock line. The time slot bit counter 74 counts each group of twelve bits after the reset bit and provides an output to the time slot counter 76. The time slot counter 76 counts the number of time slots from signals received from the time slot bit counter 74 and provides an output when its count matches that selected by the three time slot select pins.

The I/O port includes port control logic 78 which provides control of the elements described for the I/O port. The various interconnection between the port control logic 78 and the other elements previously described, have been eliminated for sake of clarity. To perform proper handshaking, the I/O port logic includes storage 80 for the following data control bits of the last frame: SOR, POR, SIA, PIA, SOA, POA. Also provided are storage element 82 for data frame (DF) flag, which indicates that the current frame is a data frame when set and indicates that the current frame is an initialization frame when reset and storage element 84 for a reset flag which indicates the condition of the reset bit in the present frame. Associated with the interface control logic 62 is a storage element 86 for the input available (INAV) flag which indicates that input data is available on the parallel interface bus DB0 through 7, and a storage element 88 for an output request (OUTREQ) flag which indicates that the peripheral device has requested data.

In addition to the pin connections described for the peripheral device interface, output data register 56, interface control logic 62 and input data register 70, the interface section of the I/O port includes output drivers 90 connected to the output data register 56 and enabled by the output enable (OUTEN) pin and input drivers 92 connected to the input data register 70. To further understand the detailed description of the I/O port in FIG. 10, the operation will now be described.

I/O PORT OPERATION

As previously described, the I/O port may be programmed from the serial loop to operate in several different modes. Programming the I/O port to its full capability requires the use of all four initialization frames. If there are other I/O ports sharing the time slot, the serial data modes are auto-determined by the I/O port at initialization. The I/O ports may be operated in either the primary or secondary data modes. In the primary data mode, the I/O ports respond only to outbound primary data control bits, POA and PIR, and send inbound only POR and PIA. While in this mode, the secondary data control bits from the loop controller are always ignored and repeated inbound. In the secondary data mode, the I/O ports respond only to outbound secondary data control bits, SOA and SIR, and send inbound only SOR and SIA while ignoring primary data control bits from the controller and repeating them inbound if SIRPIR=10. If SIRPIR=11, and the secondary inbound port has not completed its handshake, the I/O port sends inbound SIAPIA=10. If SIRPIR=11 and there is no outstanding handshake, the I/O port sends SIAPIA=01 inbound.

After receiving an Initialization sync pulse and two valid Manchester data pulses, the reset bit is loaded into the RESET Flag 84. If the RESET Flag is set, the I/O port enters a general reset condition; the remaining data control bits are reset; the interface control lines (OUTREQ and INAV) are reset to a FALSE condition; and the interface flags (INAV and OUTREQ) are reset. The I/O port then starts counting time slots using counters 74 and 76. Each group of 12 bits after the reset bit equals one time slot. The sync pulse and reset bit are always repeated inbound and all data, not in the I/O port's time slot, is delayed three bit periods in a data bypass shift register 72. Data sent inbound is repeated exactly as received until the time slot count equals the time slot selected by the time slot select pins. When the matching time slot is reached, the SIRPIR bits are bypassed on as the SIAPIA bits and are simultaneously Manchester decoded and shifted into the outbound data register 52. The first two control bits, SIRPIR, are checked to determine the binary encoded initialization frame number.

Assume the first initialization frame received is initialization frame 0 or 1. Both frames follow the same general, logical sequence. After Manchester decoding, the frame number is determined from the first two bits received, SIRPIR. If the current frame is outport initialization frame 0, and the RST Flag is set, then the I/O port enters the default state. The default state causes the parallel interface lines to be in a low TRUE mode and the input to be in This Frame Mode. The inbound data register is now loaded with the I/O port number, in this example, hex "01". The next ten outbound bits are received and Manchester decoded. If SOAPOA=00, then the I/O port sends in SORPOR=01 and enters the primary data mode. If SOAPOA=01 and the outbound device number equals hex "01", then the I/O port sends inbound SORPOR=10 and enters the secondary data mode. If the device number is not hex "01" when SOAPOA=01, or SOAPOA=1X, the I/O port sends SORPOR=11 and enters the secondary data mode. If the current frame 13 input initialization frame 1, the sequence is the same.

It must be realized that 3 bit periods after receiving the SIRPIR bits, the I/O port starts transmitting the Manchester encoded inbound word to the loop controller. This transmission will start with the SIAPIA bits followed by the device type, in this example hex "01", in the data field, and finally the SORPOR bits. This completes the I/O port operations on the serial bus. At the end of its time slot, the I/O port returns and remains in the data bypass mode until the next sync pulse is received. Any time during an initialization frame that a Manchester error is detected, the I/O port enters the data bypass mode for the remainder of the time slot.

Further programming may be done by issuing an initialization frame 2 or 3. Since the I/O port occupies both the inbound and the outbound positions of its time slot, both frames must be issued to fully program the I/O port. The initialization commands may be divided into two functional groups, port control and port handshake polarity control. The polarity of each parallel port control line corresponds to a bit in one of the initialization data fields. Thus, initialization frame 2 contains the polarity control bits for the output handshake lines; OUTAV and OUTREQ. The input handshake lines are INAV and INREQ. These are controlled by the polarity control bits in initialization frame 3. Each one of the initialization data fields is divided into two groups of bits for the Primary and Secondary Data Modes. This allows multiple ports, in the same time slot, to be programmed independently. The format of the data field during the initialization frames 2 and 3 are illustrated in Tables III and IV, respectively.

TABLE III

Initialization Frame 2
Output Programming

| | | |
|---|---|---|
| D1 OUTPUT AVAILABLE | (OUTAV) | PRIMARY DATA MODE |
| D2 OUTPUT REQUEST | (OUTREG) | |
| D5 OUTPUT AVAILABLE | (OUTAV) | DATA MODE |
| D6 OUTPUT REQUEST | (OUTREQ) | |

NOTE:
Low "TRUE" if = 0
High "TRUE" if = 1

TABLE IV

Initialization Frame 3
Input Programming

| | | | |
|---|---|---|---|
| D0 | 0 THIS FRAME MODE | (TFM) | |
| D0 | 1 NEXT FRAME MODE | (NFM) | PRIMARY DATA MODE |
| D1 | L INPUT AVAILABLE | (INAV)* | |
| D2 | L INPUT REQUEST | (INREQ)* | |
| D4 | 0 THIS FRAME MODE | (TFM) | |
| D4 | 1 NEXT FRAME MODE | (NFM) | SECONDARY DATA MODE |
| D5 | L INPUT AVAILABLE | (INAV)* | |
| D6 | L INPUT REQUEST | (INREQ)* | |

*LOW "TRUE" IF L = 0
HIGH "TRUE" IF L = 1

The state of the polarity control bit indicates the TRUE condition of the signal on that line. For example, if D6 is equal to a "0" in initialization frame 3, then a TRUE condition will exist at INREQ of the secondary data mode device when 0 volts is on that pin. Inversely, if D6 equals a "1" in initialization frame 3, then a TRUE condition is realized at INREQ when VCC is on the pin. Bits D0 and D4 are used to control the input operation of the I/O port. These bits are entirely independent of the other bits and place the I/O port in a Next Frame Mode (NFM) or a This Frame Mode (TFM).

In the Next Frame Mode, the I/O port requests a new data input immediately after recognizing that the loop controller accepted the last inbound data. No data is transferred during the current timeslot. Parallel data is loaded into the I/O port when it is available from the peripheral device. This data is sent inbound whenever the I/O port receives an input request from the loop controller.

In this frame mode, the I/O port data is input on receipt of an inbound request from the loop controller. The peripheral device must respond during a limited time to send data inbound during the current time slot. This places a strict limitation on the peripheral device to respond during the current time slot. The time limit is dependent on the I/O ports internal circuit delays and the serial loop clock frequency. This mode provides the advantage of providing the controller with the most recent data possible.

After recognizing that the received frame is either initialization frame 2 or 3, the I/O port sets the frame number on the inbound SIAPIA bits. Following this, the outbound data is transferred to the inbound data stream and the outbound data is loaded into the initialization command register 60. The command is decoded, the new mode is selected and the parallel interface is reconfigured. Finally, the bits SOAPOA are checked. The procedure for generating these bits is similar to that of initialization frames 0 and 1. However, the device type is not compared and the outbound data field has no effect on the SORPOR response. Prior to all inbound transfers, all data is Manchester encoded.

After initialization, the output request (OUTREQ) input from the peripheral device is tested. When OUTREQ is TRUE, the OUTREQ Flag is set, causing POR=1 to be sent inbound in the next dedicated time slot. On recognition of its own time slot, the I/O port starts assembling the decoded data word in the outbound data register 52. If the outbound available bit (SOA or POA) is a 1, the data is transferred to the output data register 56, the OUTREQ Flag is reset, and output available line (OUTAV) is set TRUE and the I/O port is ready to output the data onto the data bus (DB) lines. A four clock pulse timer is also started with OUTAV going TRUE.

At this point, the I/O port waits until either OUTREQ makes another FALSE to TRUE transition, or the output enable (OUTEN) line goes TRUE OUTAV will not go FALSE until any one of three conditions are met. In the first, time-out occurs and OUTEN stays TRUE. If time-out occurs before OUTEN is TRUE, then OUTAV stays TRUE until OUTEN does go TRUE. The second condition for resetting the timer is OUTEN pulsing TRUE, then FALSE, before time-out. The last condition occurs anytime that OUTREQ changes from FALSE to TRUE.

The OUTREQ Flag is set by either a new OUTREQ FALSE to TRUE transition or OUTREQ still TRUE when OUTAV is set FALSE. Thus, by holding OUTREQ TRUE, it is possible to request a new word on the second frame after each word is received. With OUTEN held TRUE, each new word is heralded by a four clock period long pulse of OUTAV. Assuming maximum throughput at the loop controller, new data will appear on the port at every other frame. Note that the DB lines will switch levels only with OUTAV and the new data. The current contents of the output data register 56 is always driven on the DB lines when OUTEN is TRUE.

The I/O port has two parallel data input modes, THIS FRAME MODE (TFM) and NEXT FRAME MODE (NFM). While in NFM, the INAV FLAG is reset with the Reset bit or after every serial inbound data transfer. When the INAV FLAG is reset, a TRUE is placed on the INREQ line and a timer is enabled. Whenever INAV is TRUE, the data on the DB0-7 lines is loaded into the input Data Register 70. At this time, the INAV FLAG is set indicating that the timer has reached four full clock periods and INAV is TRUE. The INREQ line remains TRUE after time out if INAV is not TRUE and is set FLASE then when INAV goes TRUE. In TFM, the INAV FLAG is reset only when the timer has reached four full clock periods. In TFM, the INAV FLAG is reset only when an inbound Data Request is received on the serial loop. At this time, the INREQ line is set TRUE and the timer is started. When the INAV line goes TRUE, data is loaded from the DB0-7 lines into the input data register 70. INREQ is set FALSE and the INAV Flag is set at this time indicating that the data word is available to send inbound. The timer informs the port control logic when it is too late to send data inbound. The time limit is determined by the required, minimum circuit delay time and the clock frequency. The circuit delay is the time required to propagate through the I/O port from the port control logic to the parallel port control lines and back to the port control logic. The peripheral device has approximately three bit periods of delay time minus the internal circuit delay time to respond with the input control signals.

After recognizing a data frame control sync and two valid Manchester bits, the Reset bit is loaded into the RST Flag. If the RST Flag is set, the I/O port is reset and returns to the data bypass operation and time slot comparison is suppressed. If the RST Flag is reset, the I/O port starts counting time slots. When the count equals the time slot select, the outbound data is switched from the serial bypass register 72 Manchester decoded, and shifted into the outbound data register 52. The sequence from this point is dependent upon the previous data frame. There is a basic relationship between the outbound format and inbound format that should be identified. The outbound SIRPIR bits control the reaction of the I/O port's inbound data and SIAPIA bits. Similarly, the I/O port's inbound SORPOR bits control the loop controller's outbound SOAPOA bits and data. The actions of SIRPIR-SIAPIA bits are independent of the SORPOR-SOAPOA bits.

In the primary outbound data mode, the I/O port generates only the POR control bit and responds only to the POA bit. The SOA is always repeated inbound as the SOR bit unless a Manchester error is detected on SOAPOA bits. In this case, the last valid SORPOR bits are sent inbound. If the present POA is a 0, then the OUTREQ FLAG is checked. A set OUTREQ Flag causes the POR bit to be sent inbound as a 1. If the flag is reset, then the POR is sent inbound as a 0. Setting of the OUTREQ Flag is dependent on the parallel interface operation.

When a data has been transfered to the I/O port in the last frame, the last frame's POA bit would have been a 1. If this frame's POA is still a 1, then the I/O port was unable to complete the handshake. Consequently, the POR bit is sent in again as a 0. If the last frame's POA was a 0, and this frame's POA is a 1, then the current data word residing in the outbound data register 52 is designated for this I/O port. The data is transferred from the outbound data register 52 to the output data register 56 and the OUTREQ Flag is reset. Finally, the POR bit is sent inbound as a 0, indicating valid receipt of the data from the loop controller.

Figure 11:
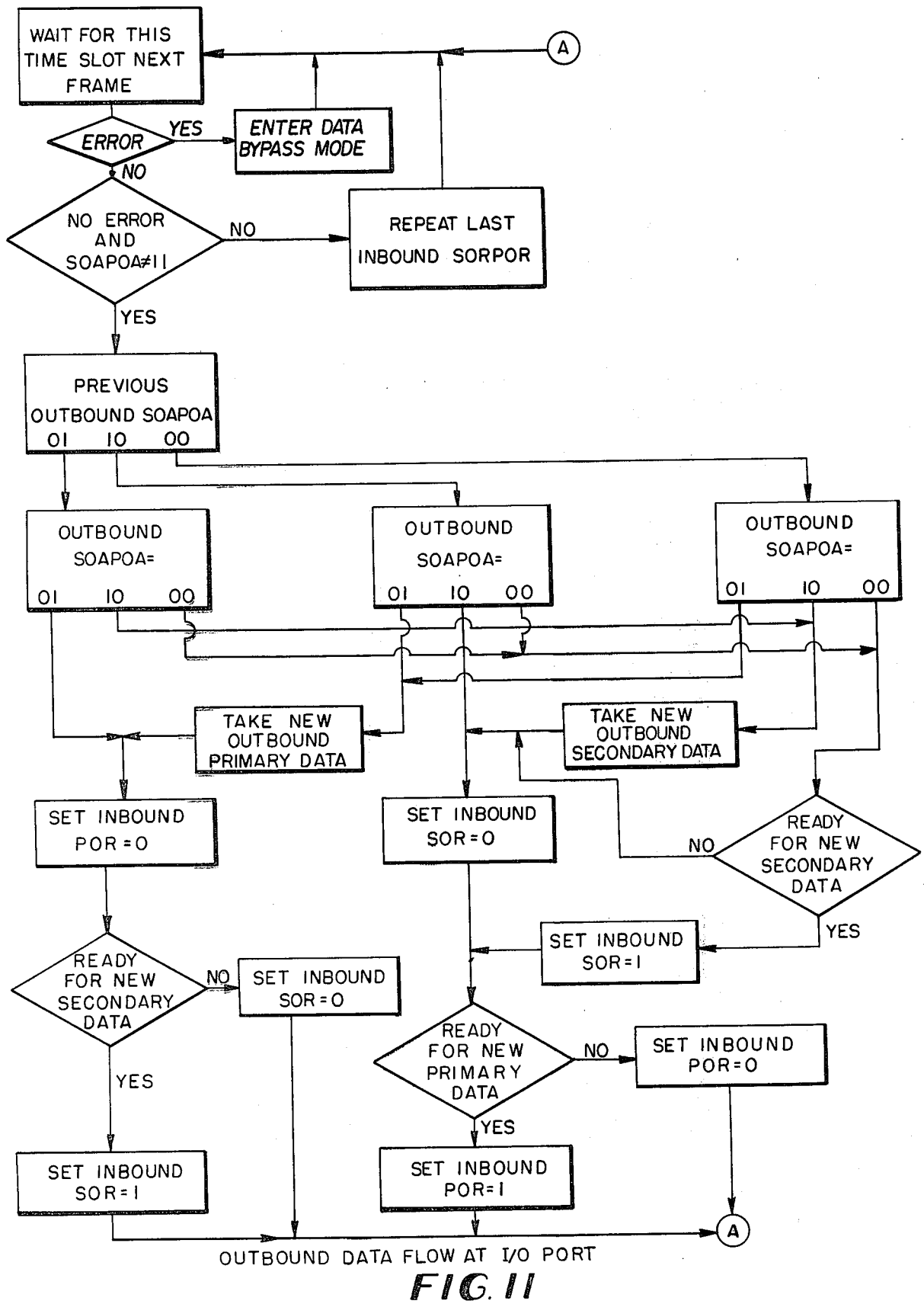
FIG. 11 is a flow diagram for outbound data flow at the I/O port.

Operation in the secondary outbound data mode is the same as in the primary outbound data mode. The only difference being that the I/O port operates with the SOR-SOA control bits instead of the POR-POA control bits. A flow chart of the outbound data flow at the I/O port is illustrated in FIG. 11.

As just illustrated, the inbound data flow is almost entirely independent of the outbound data flow. Assuming that initialization has just been completed, the I/O port is in the primary data mode and this is the first data frame, the Controller requests inbound data by setting PIR to a "1". In the This Frame Mode, the INAV FLAG is reset, causing the parallel interface to initiate an input request and start the timer. If the INAV FLAG is set before timeout, the eight bits of input data are sent inbound along with PIA=1 and SIA=SIR. If timeout occurs before the INAV Flag is set, eight "don't care" bits of data are sent inbound along with PIA=0 and SIA=SIR.

If the I/O port is in the NEXT FRAME MODE, the INAV FLAG is reset after every completed inbound data transfer and handshake. When the INAV Flag is reset, the INREQ is set TRUE and a timer is started. The timer determines the minimum pulse width of INREQ. When INAV goes TRUE, the DB lines are loaded into the input data register 70. INREQ is set FALSE after the timer has completed four full clock periods and INAV is TRUE. INAV FLAG is set TRUE when INAV goes TRUE, indicating data is available to send inbound. When an outbound PIR=1 is received, the I/O port then sends inbound the current contents of the input data register 70 along with PIA=1. If a PIR=1 occurs before the INAV Flag is set, the response is PIA=0. In the case where the last PIA=1 and the current frame PIR=1, then the last frame's data is sent inbound along with PIA=1. In all cases, the inbound SIA=SIR.

Figure 12:
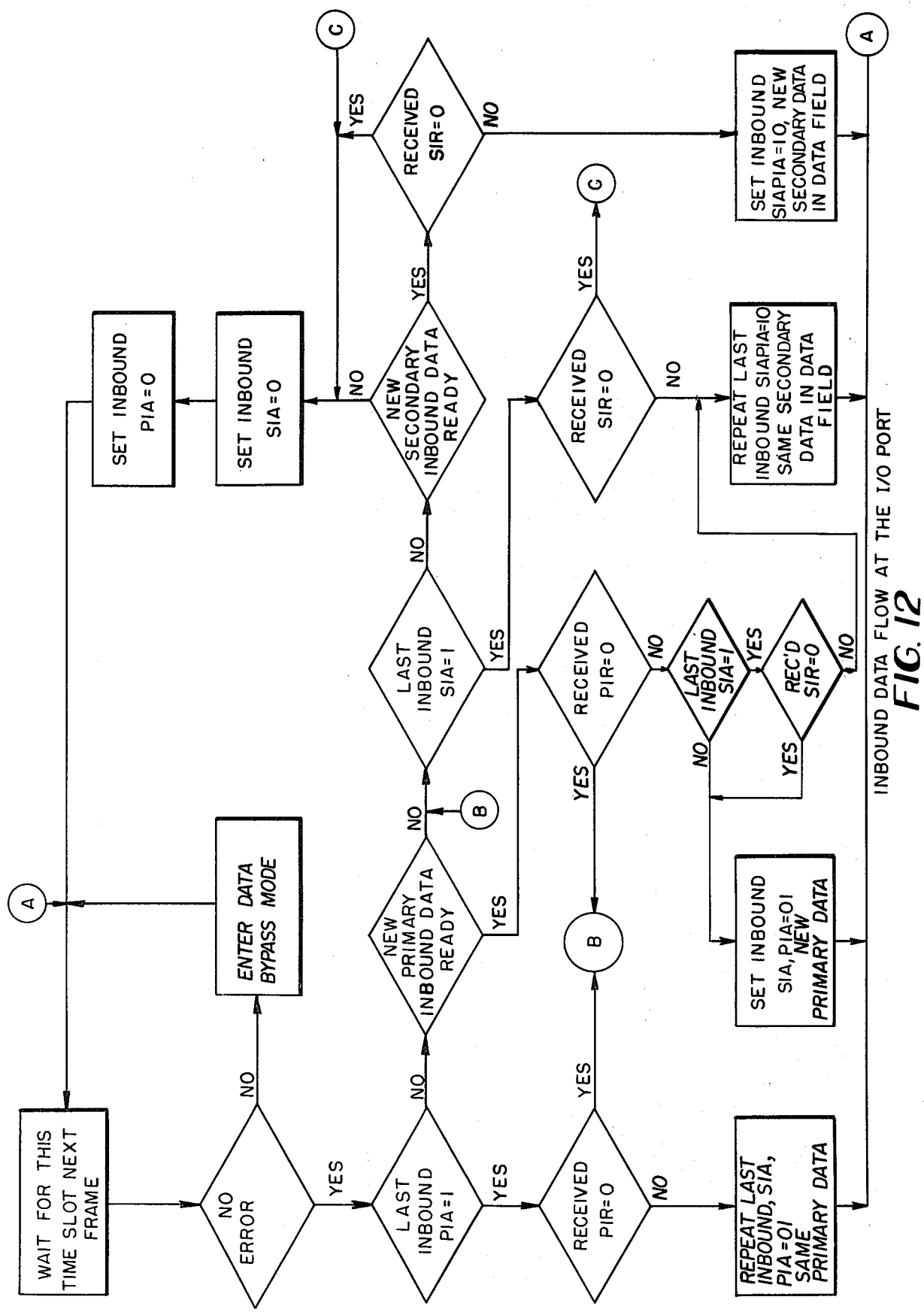
FIG. 12 is a flow diagram for inbound data flow at the I/O port.

If the current outbound SIR=0 and the I/O port is in the secondary data mode, the I/O port passes the outbound data to the inbound data, sends SIA=0 and PIA=PIR. If the previous frames' SIA was 1 then the INAV Flag is reset. If the current outbound SIRPIR=10, the SIR bit follows the state of the INAV FLAG. If INAV Flag=1 then SIR=1 and the input data register data is sent inbound. In both cases, PIA=-PIR. If the current outbound SIRPIR=11, the response is dependent on the previous frame's SIA. If the last frame's SIA=1, then the handshake was incomplete and must be completed, regardless of the primary device's action. In this case a SIAPIA=10 and the contents of the input data register 70 are sent inbound. When the last frame's SIA=0, then there are no outstanding handshakes at the secondary data mode I/O port and the outbound data is repeated inbound along with SIAPIA=01. A flow chart of the inbound data flow at the I/O port is illustrated in FIG. 12.

SERIAL LOOP CONTROLLER

Figure 13:
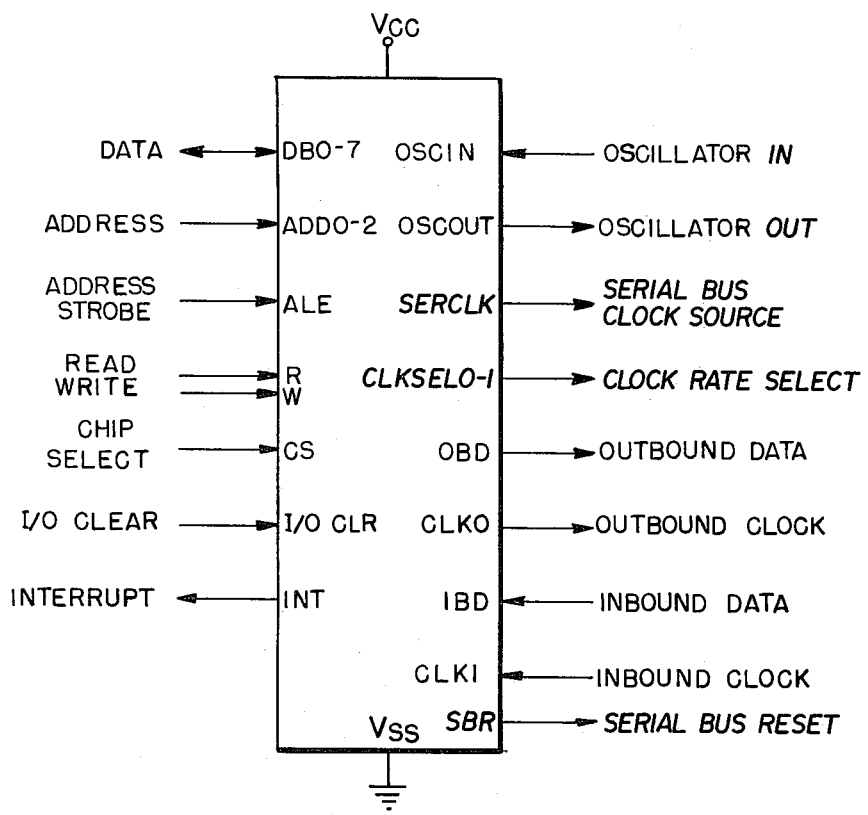
FIG. 13 is a block diagram of the pin connections of a serial loop controller.

A serial loop controller for interfacing an eight bit host bus to the serial loop is illustrated in FIG. 13. The serial loop controller includes an outbound data pin (OBD) to provide an outbound data around the loop and an inbound data pin (IBD) to receive the inbound data from the serial loop. The other interface pin to the serial loop are the outbound clock pin CLKO, inbound clock pin CLK1 and serial bus result pin SBR. For interfacing with the host bus and host processor, the serial loop controller includes eight data pins DB0-7, three address pins DD0-2, address strobe pin ALE, read pin R, write pin W, a chip select pin CS, I/O clear pin I/OCLR and an interrupt pin INT. The remaining pins include the power supply pins VCC and VSS and oscillator in pin OSCIN, an oscillator out pin OSCOUT, a clock input pin SERCLK and clock rate select pins CLKSELD, 1. Although FIG. 13 is for an eight bit data bus, other data buses may be used requiring additional pin connections. For example, the interface may be made with a twelve and a sixteen bit bus.

The loop controller includes the appropriate Manchester encoders, decoders, inbound and outbound registers and timing circuits to generate the frames previously described. To support the previously described operation of the serial loop controller and the to be described interface with the host processor and bus, the serial loop controller includes the storage elements of Table V. By using corresponding storage and buffer elements, the interface of the host parallel bus can be asynchronous with the interface of the serial loop. The storage elements of Table V for the inbound and outbound time slots are required for each of the eight time slots. Only one of each buffer element is required. For the inbound time slots storage elements, no changes due to the inbound data stream will take place if inbound frame synchronization has not been required or has been declared lost by the loop controller. Also, no change will occur to the data storage for any inbound time slot which contains a Manchester error or the invalid SIAPIA=11.

Data is transferred to or from the host processor via the DBO-7 bus pins. The data to be transferred is selected by the ADDO-2 address lines. The address can be applied continuously (ALE tied high) or can be internally latched by the falling edge of ALE. The address must be latched or applied before the read or write operation. Also, the chip select CS lines must be activated during the read or write operation. Read is activated by the R signal low. Write is activated by the W signal low. I/OCLR causes a complete internal reset followed (after the L to H transition) by a serial loop initiation sequence in which all serial I/O ports are reset and programmed to their default stage. The INT line is true whenever the loop controller internal interrupt enable flip flop is true and any I/O port or the loop controller has an interrupt condition true.

TABLE V

| LOOP CONTROLLER INBOUND TIMESLOT STORAGE/BUFFER | | |
|---|---|---|
| NEMONIC | FUNCTION | BITS |
| PIDS/PIBR = | Primary Inbound Data Storage/Buffer register | 8 |
| SIDS/SIBR = | Secondary Inbound Data Storage/Buffer register | 8 |
| PIAS = | Primary Inbound Data Available Storage | 1 |
| SIAS = | Secondary Inbound Data Available Storage | 1 |
| PIFS/PIFB = | Primary Inbound Flag Storage/Buffer | 1 |
| SIFS/SIFB = | Secondary Inbound Flag Storage/Buffer | |
| PIIES/PIIEB = | Primary Inbound Interrupt Enable Storage/Buffer | 1 |
| SIIES/SIIEB = | Secondary Inbound Interrupt Enable Storage/Buffer | 1 |
| PICAS/PICAB = | Primary Inbound Channel Active Storage/Buffer | 1 |
| SICAS/SICAB | Secondary Inbound Channel Active Storage/Buffer | |
| PORS | Primary Outbound Data Request Storage | 1 |
| SORS | Secondary Outbound Data Request Storage | 1 |
| LOOP CONTROLLER OUTBOUND TIMESLOT STORAGE/BUFFER | | |
| NEMONIC | FUNCTION | BITS |
| PODS/POBR = | Primary Outbound Data Storage/Buffer Register | 8 |
| SODS/POBR = | Secondary Outbound Data Storage/Buffer Register | 8 |
| POAS = | Primary Outbound Data Available Storage | 1 |
| SOAS = | Secondary Outbound Data Available Storage | 1 |
| POFS/POFB = | Primary Outbound Flag Storage/Buffer | 1 |

TABLE V-continued

| | | |
|---|---|---|
| SOFS/SOFB = | Secondary Outbound Flag Storage/Buffer | 1 |
| POIES/POIEB | Primary Outbound Interrupt Enable Storage/Buffer | 1 |
| POCAS/POCAB = | Primary Outbound Channel Active Storage/Buffer | 1 |
| SOCAS/SOCAB | Secondary Outbound Channel Active Storage/Buffer | |
| PIRS = | Primary Inbound Data Request Storage | 1 |
| SIRS = | Secondary Inbound Data Request Storage | 1 |
| RS = | Retransmit storage | 1 |
| PHCS/PHCB | Primary Handshake Control Storage/Buffer | 1 |
| SHCS/SHCB = | Secondary Handshake Control Storage/Buffer | 1 |

| OTHER LOOP CONTROL STORAGE | |
|---|---|
| Initialization Command | 3 |
| Bus Idle | 1 |
| Initialization Command Done | 1 |
| Sync Acquired | 1 |
| Lost Sync | 1 |
| Lost Clock | 1 |
| Controller Interrupt Enables | 1 |
| Time Slot Selected | 4 |

For multiplexed Address/Data bus operation, ADDO-2 is tied externally to the appropriate DBO-2 lines and the ALE input is arranged to latch the address input. For separate address bus operation, ADDO-2 is tied to the appropriate address pins of the host processor bus. The formats of the data, command and status transfers to and from the loop controller are discussed below. The data direction and identification is determined by the R or W pulse and by ADDO-2. With the exception of the time slot select read and write (ADDO-2=100) and the interrupt vector read (ADD0-2=110), all transfers pertain to the currently selected time slot or to the loop controller as determined by the most recent time slot select write command (ADD0-2=100) or interrupt vector read and select command (ADD0-2=100).

A Primary Outbound Data (ADD0-2=000) write causes data to be written to the primary outbound buffer register and then to the primary outbound data storage for the currently selected time slot. It also causes the primary outbound flag buffer to be cleared which will cause the primary outbound flag storage to be cleared following the parallel bus operation unless the primary outbound flag storage is already cleared, in which case no operation on the flag storage occurs. A Primary Outbound Data read (ADDO2=000) reads the current contents of the primary outbound data buffer. Writes and reads for Secondary Outbound Data (ADD0-2=001) behave exactly the same as to the Primary Outbound Data address except the secondary outbound buffer register, secondary data storage, secondary outbound flag storage and secondary outbound flag buffer are involved.

Primary Inbound Data (ADD0-2=101) writes are no-op. Primary Inbound Data reads read the current contents of the primary inbound buffer register. This action also causes the primary inbound flag buffer to be cleared which will cause the primary inbound flag storage to be cleared, if it is not already cleared following the parallel bus operation. Writes and reads for Secondary Inbound Data (ADD0-2=011) behave exactly the same as the Primary Inbound Data Address except that the secondary inbound buffer register, secondary inbound data storage, secondary inbound flag buffer and the secondary inbound flag storage are involved.

Time Slot Select (ADD0-2=100) reads read the currently selected time slot number or indicates that the controller or nothing is selected. Time Slot Select writes load the select register which causes the selection of either the controller or one of the eight time slots or nothing. When a write occurs to this address that selects a time slot, a special update to the buffer storage occurs once following the parallel bus operation. Until this buffer update process is completed, all zero's (nothing selected) is read back on any read to this address. In each case, the buffer is updated from the corresponding time slot storage of the selected time slot. All these buffer registers are cleared when either the controller or nothing is selected.

An Intercept Vector Read and Select (ADD0-2=110) writes are a no-op. Reads to this address read a vector unique to each type of loop controller or I/O port interrupt or a vector indicating no interrupt. If a I/O port or loop controller interrupt is read, the indicated time slot or the loop controller is also selected by this operation. If a "no interrupt" condition is read, no selection operation occurs. For the case where there is both an I/O port and a loop controller interrupt pending at the time of the read, the controller interrupt will govern. The logic must make a decision on the leading edge of the true "chip select" condition to determine if "no interrupt", "controller interrupt" or "time slot" interrupt is to be enabled for this read operation. For the case of a time slot interrupt, the buffer load operation specified in the Time Slot Select operation occurs. For the case of a controller interrupt these buffers are all cleared as in the time slot select operation. For the case of no interrupt, no operation occurs except for the "all zero's" read.

Primary Channel Control/Status or Controller Control/Status (ADD0-2=101) write and reads provide control information to and status information from either the indicated time slot storage and buffers or the controller status and control bits. If nothing is selected, write and reads to this address is a no-op except for an all zero's read. The data bus BDO-7 for a time slot selected read include Primary Outbound Channel Active Buffer (POCAB), Primary Inbound Channel Active Buffer (DICAB), Primary Handshake Control Buffer (PHCB), Primary Outbound IEB Buffer (POIEB), Primary Inbound IEB Buffer (PIIEB), Primary Outbound Flag Buffer (POFB), and Primary Inbound Flag Buffer (PIFB). The data bus DBO-7 for a time slot select write includes Primary Handshake Control Buffer (PHCB), Primary Outbound IEB Buffer (POIEB), and Primary Inbound IEB Buffer (PIIEB). The write causes the three buffers to be loaded with the new data. After the parallel bus operation, the contents of these buffers are loaded into the corresponding time slot storage for the selected time slot. The data bus DBO-7 for the controller select and read includes Initialization Command, Bus Idle, Initialization Command Done, Sync. Acquired, Lost Sync., and Lost Clock. The data buss DBO-7 for controller select write includes initialization commands and overall interrupt enable and disable.

The initialization commands include a return to normal command to return to normal mode on the next outbound frame. An I/O reset command produces continuous #1 frames with the reset bit is set until the reset bit received in error free frame. All controller outbound flags are set and inbound flags and all timeslot interrupt enable flip-flops are cleared when this frame is received. Channel Active Update Command generates a frame #10 with reset bit cleared followed by frame #1 with reset bit cleared, stay in frame #1 until command to normal. An initialization "done" is declared when both frame 0 and 1 are received error free. Channel Active Data may be read from inbound storage. Programming information may be loaded into outbound storage. Devices are not reset and the programming state is undisturbed. A Default and ID Command is the same as Channel Active Update except rest bit is set in frame #0 causing all devices to return to the default mode and to be reset. All controller outbound flags are set, interrupt enable flip-flops are cleared and inbound flags are cleared when this frame #0 received. A Reset and ID Command is the same as Channel Active Update except the rest bit is set in frame #1 and not in frame #0, causing all devices to be reset. Device programming information is not disturbed. The loop controller sets and resets the same as Default and ID. A Program Command transmits frame number 2 and 3 with reset bit set. Program data is outputted. A "done" is declared when both frames 2 and 3 have been received without error.

Secondary Channel Control/Status or Controller Control Status (ADD0-2=111) writes and reads provide control information and status information from either the time slot storage and buffers or the controller status and control bits. If either nothing or the controller is selected, operation is identical to address 101 discussed above. For a time slot selected, formats and operation are exactly as outlined for address 101 above, except the secondary rather than the primary buffers and time slot storage are involved.

LOOP CONTROLLER SERIAL LOOP OPERATION

An outbound data sequence at the loop controller begins when a primary or secondary outbound flag storage is set. This bit may be set when the first inbound POR=1 after one or more frames of outbound POA=1. The host processor response to the set flag by outputting new primary or secondary data to the outbound primary or secondary data storage through the appropriate buffer and clears the associated flag. The loop controller then waits for a primary or secondary data request (POR or SOR=1). Upon receipt of a primary or secondary data request from the I/O port, the loop controller transmits the waiting data with the outbound control bit POA or SOA set to one. The outbound available storage POAS or SOAS is also set. The outbound data and the outbound data control bit POA or SOA indicating data is available is transmitted on as many frames as is necessary for the received data requests control bit to go to zero, which indicates receipt by the I/O port of the request data. To complete the serial loop handshake, the loop controller sends outbound an outbound control bit SOA or POA of zero to acknowledge the inbound outbound data request SOR or POR going to zero.

Figure 14:
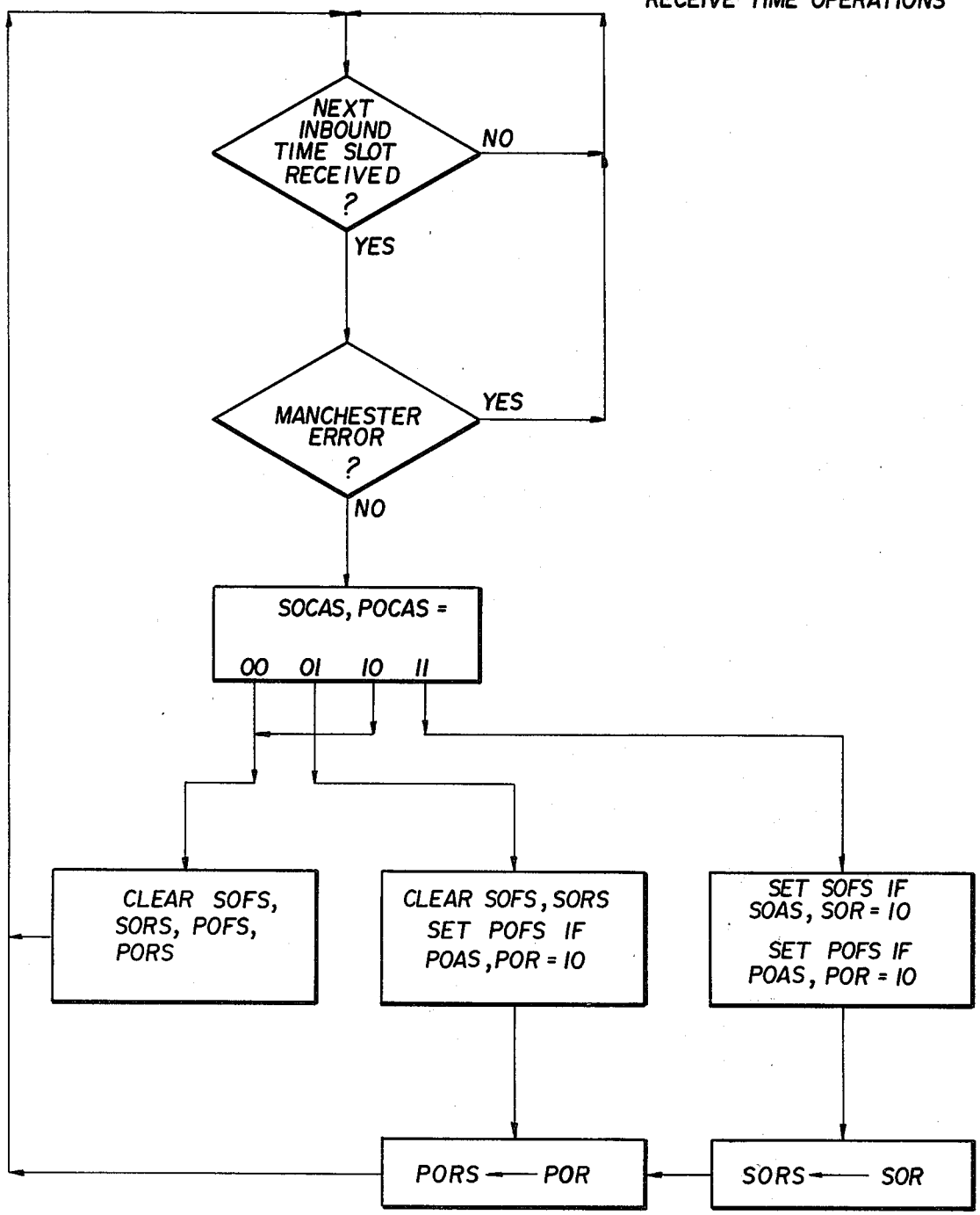
FIG. 14 is a flow diagram of outbound data flow at the loop controller during receive time operations.

In order to provide maximum time for software to respond to said flags, the transmit or outbound sequence is divided into a received time sequence which is concerned with the set flag operations and a transmit time sequence which is concerned with the decisions to transmit new outputs, retransmit previous outputs or transmit no information. These sequences are illustrated in FIGS. 14 and 15 respectively. All of the transmit decisions and operations operate on the control bits in the inbound time slots and the time slots storage. As discussed previously, by using separate outbound control bits for primary and secondary data transfers, data can be outbound to primary and secondary devices in the same slot in an interleaded fashion without waiting for a complete serial loop handshake.

An inbound data sequence begins with the primary or secondary inbound flags cleared and a PIR or SIR is sent outbound requesting inbound data. The primary or secondary inbound request storage bit is set. New inbound data is detected by the 0-1 transition on the inbound PIA or SIA of a time slot. The new data is taken into the inbound primary or secondary data storage and the associated inbound flag is set. On the next outbound frame, the associated PIR or SIR is cleared to indicate to the I/O port proper reception of the new data. On the next inbound frame, if the PIA or SIA bit has not been cleared, the next outbound frame will have the SIR or PIR set to zero again to attempt to close the loop.

The availability of inbound data at the loop controller is indicated to the host processor by the inbound flag being set. The processor upon reading of the available inbound data clears the inbound data flag. The request of further or new inbound data is under the control of the handshake control storage PHCS or SHCS. This value is determined by the host processor. If the associated handshake control PHCS or SHCS is set, the outbound PIR or SIR bit is not set again until the host processor takes the last received data and clears the inbound flag. If the handshake and inbound flag are set, the outbound PIR or SIR is held to zero. When the host processor takes the data and clears the inbound flag, the PIR or SIR bit is set outbound permitting the I/O port to send the next data when ready. Once the handshake control PHCS or SHCS is reset by the host controller, the outbound SIR or PIR bit is set whenever the associated SIA or PIA bit is cleared. The inbound date sequence at the loop controller is illustrated in FIGS. 16 and 17. All the inbound operations use the inbound time slot information and the time slot storage and operate on the time slot storage. Operation may be split between receive and transmit time as shown in FIGS. 16 and 17.

From the preceding description of the preferred embodiments, it is obvious that the objects of the invention are attained in that a serial loop is provided having unique loop controller and I/O ports which are capable of operating at high speed and performing byte transfer with a minimum number of overhead control bits and host processor software. The interfacing of the host bus to the loop controller and the I/O ports to the peripheral devices are mere examples. Interface for other types of buses, for example, an eight bit, 8080 or 8085 bus, a twelve bit Harris 6120 bus or sixteen bit 8086 bus may also be provided. The I/O ports may interface with a UART/Baud regenerator, four digit, seven segment LED display controller, 24 kg keyboard encoder or an IEEE 488 bus. Although the invention has been described and illustrated in detail, it is to be clearly understood that the same is by way of example and illustration only and is not to be taken by way of limitation. The spirit and scope of the present invention is to be limited only by the terms of the appended claims.

What is claimed:

1. A serial loop comprising:
   loop controller means for controlling the transmission of data outbound onto said loop and reception of data inbound onto said loop by generating a plurality of frames, each of which includes a frame control field followed by a fixed number of fixed bit length time slot fields, each time slot field including an inbound data control field, a data field and an outbound data control field; and
   a plurality of I/O means connected in a series loop to said loop controller, means, each for receiving said frames, monitoring one of said time slot fields to which the I/O means is dedicated, inserting data into the data field of said dedicated time slot field if so signified by the inbound data control field, and removing data from said data field of said dedicated time slot field if so signified by the outbound data control field.

2. The serial loop according to claim 1 wherein said I/O means includes means for inserting a value in the inbound data control field indicating insertion of data into said data field and inserting a value in the outbound data control field indicating receipt of data from said data field.

3. The serial loop according to claim 2 wherein said data control field inserting means also inserts a value in said outbound data control field to request data from said loop controller means.

4. The serial loop according to claim 1 wherein said plurality of I/O means includes an input I/O means for only inputting data into the data field of a dedicated time slot if so signified by the inbound data control field and an output I/O means for only outputting data from the data field of a dedicated time slot if so signified by the outbound data control field, said input I/O means and output I/O means having the same dedicated time slot.

5. The serial loop according to claim 4 wherein said output I/O means preceds said input I/O means on said loop relative to said loop controller means.

6. The serial loop according to claim 1 wherein said inbound and outbound data control fields each includes a primary data control bit and a secondary data control bit field, said plurality of I/O means includes a primary I/O means and secondary I/O means having the same dedicated time slot, said primary and secondary data control bit fields determining accesses to said data field by said primary and secondary I/O means.

7. The serial loop according to claim 6 wherein said primary I/O means precedes said secondary I/O means on said serial loop relative to said loop controller means.

8. The serial loop according to claim 1 wherein said inbound and outbound data control fields include a primary data control bit field and a secondary data control bit field, said plurality of I/O means includes a primary input I/O means for only inputting data into the data field of a dedicated time slot if so signified by the primary inbound data control bit field, primary output I/O means for only outputting data from the data field of a dedicated time slot if so signified by the primary outbound data control bit field, a secondary input I/O means for only inputting data into the data field of a dedicated time slot if so signified by the secondary inbound data control bit field, and a secondary output I/O means for only outputting data form the data field of a dedicated time slot if so signified by the secondary outbound data control bit fields, said primary input and output I/O means and said secondary input and output I/O means having the same dedicated time slot.

9. The serial loop according to claim 8 wherein said primary output I/O means precedes said secondary output I/O means which precedes said primary input I/O means which in turn precedes said secondary input I/O means on said serial loop.

10. The serial loop according to claim 1 wherein said loop controller means and said plurality of I/O means each include handshake means for requesting data by inserting a first value in one of said data control fields, for indicating receipt of said data by inserting a second value in said one data control field if previously requesting data, for indicating insertion of data by inserting a third value in the other data control field and for acknowledging presence of said third value in the other data control field if previously inserting second value in the other data control field by inserting a fourth value in said other data control field.

11. In a serial loop for transmitting data outbound from a loop controller to a plurality of I/O means serially connected to said loop controller means and for receiving data inbound to said loop controller means from said plurality of I/O means, the improvement comprising:
    said loop controller means generating a plurality of frames each of which includes a frame control field followed by a fixed number of time slot fields, each time slot field including an inbound data control bit, an eight bit data field and an outbound data control bit;
    said I/O means monitoring one of said time slot fields in said frame to which the I/O means is dedicated, and inserting data in said dedicated data field when permitted by said inbound data control bit and removing data from said dedicated data field when permitted by said outbound data control bit.

12. The serial loop according to claim II wherein loop controller means and said I/O means each include outbound data handshake means for inserting a value in the outbound data control bit at said I/O means requesting date for inserting a value in the outbound data control bit at said loop controller means indicating data insertion into said data field, for inserting a value in said outbound data control bit at said I/O means indicating receipt of the data, and for inserting a value in said outbound data control bit at said loop controller means acknowledging receipt of data by said I/O means.

13. The serial loop according to claim 11 wherein said loop controller means and said I/O means each include inbound data handshake means for inserting a value in said inbound data control bit at said loop controller means requesting data, for inserting a value in said inbound data control bit at said I/O means indicating insertion of data in the data field, for inserting a value in said inbound data control bit at said loop controller means indicating receipt of data, and for inserting a value in said inbound data control bit at said I/O means acknowledging receipt of said data by said loop controller means.

14. The serial loop according to claim 11 wherein said time slot fields include a second inbound data control bit and a second outbound data control bit, said loop controller means and said I/O means include priority logic means for providing inbound and outbound data control bits priority over said second inbound and outbound data control bits respectively.

15. The serial loop according to claim 14 wherein said I/O means includes primary and secondary I/O means for inputting and outputting data in the same dedicated data field, inputting I/O means for only inputting data in its dedicated data field and outputting I/O means for only outputting data from the same dedicated data field as said inputting I/O means.

16. The serial loop according to claim 15 wherein said primary I/O means precedes said secondary I/O means on said serial loop and said outputting I/O means precedes said inputting I/O means on said serial loop.

17. In a time division multiplexed serial loop having a loop controller means for sending data outbound to and for receiving data inbound from a plurality of I/O means on said loop, the improvement comprising:
said loop controller means generating a plurality of frames on said serial loop, each frame including an inbound data control field followed by a data field followed by an outbound data control field,
each of said I/O means including means for storing inbound data, means for storing outbound data, and logic means for monitoring said inbound and outbound data control fields and controlling said storing means to insert data from said inbound data storage means in the data field of one of said frames to which the I/O means is dedicated as dictated by the inbound data control field and to remove data from said dedicated data field into said outbound data storage means as dictated by the outbound data control bit.

18. A time division multiplexed serial loop according to claim 17 wherein each I/O means includes means to delay the bits on said loop the bit length of the inbound data control field plus one bit.

19. A serial loop comprising:
loop controller means for generating a plurality of frames around a serial loop, each of said frames including a frame control field followed by a fixed plurality of time slot fields each of which includes a data control field and a data field; and
a plurality of I/O means serially connected to said serial loop, each for detecting said frame control field to determine the position in said frame of one of said time slot, fields to which the I/O means is dedicated, monitoring said frame control field to determine whether the frame is an initialization or data frame, and removing or inserting data into the data field of said dedicated time slot as dictated by its data control field.

20. The serial loop according to claim 19 wherein said frame control field is three bits having a first value for a bit and a half and a second value for a bit and a half to distinguish it from other bits in the frame and indicate a data frame, an initialization frame being indicated by a second value followed by a first value.

21. The serial loop according to claim 19 including a reset bit between said frame control field and said time slot fields and each of said I/O means including means for monitoring said reset bit to reset itself during an initialization frame or data frame if so indicated.

22. The serial loop according to claim 19 wherein each of said I/O means includes means for inserting data in its data control field as a response to the received data control field.

23. The serial loop according to claim 19 wherein said I/O means includes means for storing a device code and said I/O means inserts said code in its data field during initialization if requested by the data control field.

24. The serial loop according to claim 23 wherein said loop controller includes means monitoring said time slots during initializations for detecting dedication conflict of I/O means.

25. The serial loop according to claim 19 wherein said I/O means includes means for monitoring the data control field of bit dedicated time slot field during an initialization frame, means for setting the I/O means into a primary data mode if the monitored initialization data control field indicates no prior I/O means response and into a secondary data mode if the monitor initialization data control field indicates prior I/O means response, and means for inserting a response in the data control field during initialization.

26. The serial loop according to claim 25 wherein said I/O means includes means for storing device code and said I/O means inserts said code in its data field during initialization if requested by the data control field.

27. The serial loop according to claim 26 including means for comparing device code in the data field if a prior I/O means response is in the data control field, and said response means inserts a response indicating device code match or mismatch.

28. A serial loop comprising:
loop controller means for generating a plurality of frames around a serial loop, each of said frames including a frame control field followed by a fixed plurality of time slot fields each of which includes data control field and a data field; and
a plurality of I/O means serially connected to said serial loop, each including means for monitoring the frame control field to determine whether the frame is an initialization or a data frame and for monitoring the control data field of one of said time slot fields to which the I/O means is dedicated to determine whether there has been a prior I/O means response, means for setting the I/O means into a primary data mode if there has not been a prior I/O means response and into a secondary data mode if there has been a prior I/O means response, and means for inserting a response in the date control field during an initialization frame.

29. The serial loop according to claim 28 wherein the data control field includes a primary data control bit and a secondary data control bit and said monitoring means monitors the primary and secondary control bit of its dedicated time slot during data frames to provide access to the data field according to the data mode of the I/O means.

30. A serial loop bus for interconnecting a host bus and a plurality of input-output devices comprising:
a loop controller means interconnecting said host bus and a serial loop for controlling the transmission of data outbound from the host bus to input-output devices on the serial loop and the transmission of data inbound from the input-output devices to the host bus including means for generating a plurality of frames each of which includes a frame control field and a fixed plurality of time slot fields, each of said time slots including an inbound data control field, a data field and an outbound data control field; and a plurality of I/O means interconnecting input-output devices to said serial loop, each for monitoring said frames to detect one of said time slot fields to which said I/O means is dedicated, inserting data from its device into the dedicated data field when permitted by said inbound data control bit and removing data from said dedicated data field when permitted by said outbound data control bit.

31. The serial loop bus according to claim 30 wherein said loop controller means includes means for storing inbound data for said host bus, and handshake means controlled by the host bus for controlling said generating means to prevent transmission of new data from an I/O means if its associated inbound data storing means is occupied.

32. The serial loop bus according to claim 31 wherein said loop controller means includes means for storing outbound data from said host bus and means controlled by said loop controller for preventing transmission of outbound data from said host bus to said outbound data storage means if said outbound data storage means is occupied.

* * * * *

UNITED STATES PATENT AND TRADEMARK OFFICE
CERTIFICATE OF CORRECTION

PATENT NO. : 4,389,721

DATED : June 21, 1983

INVENTOR(S) : William R. Young, Stanley R. Zepp

It is certified that error appears in the above—identified patent and that said Letters Patent is hereby corrected as shown below:

Column 2, line 28, "hot" to --host--;

line 59, "wave forms" to --waveforms--;

Column 3, line 53, "of" to --or--;

Column 5, line 2, "SIR to PIR" to --SIR or PIR--;

Column 12, line 48, "timeslot" to --time slot--;

Column 13, line 23, insert a period after "TRUE";

line 56, "FLASE" to --FALSE--;

Column 14, line 38, "transfered" to --transferred--;

Column 17, line 34, "(ADD0-2 = 100)" to --(ADD0-2 = 110)--;

Column 18, line 32, "If a" to --If an--;

Column 19, line 5, "buss" to --bus--;

line 11, delete "is";

line 12, "received in" to --receives an--;

line 68, "request" to --requested--;

UNITED STATES PATENT AND TRADEMARK OFFICE
CERTIFICATE OF CORRECTION

PATENT NO. : 4,389,721
DATED : June 21, 1983
INVENTOR(S) : William R. Young, Stanley R. Zepp It is certified that error appears in the above—identified patent and that said Letters Patent is hereby corrected as shown below:

Column 20, line 51, "date" to --data--;

Column 21, line 2, "kg" to --key--;

line 20, delete the comma after "controller";

line 48, "preceds" to --precedes--;

Column 22, line 6, "form" to --from--;

line 48, "II" to --11--;

line 52, "date" to --data--.

Signed and Sealed this

Eighteenth Day of October 1983

[SEAL]

Attest:

GERALD J. MOSSINGHOFF

Attesting Officer       Commissioner of Patents and Trademarks